June 7, 1960

V. C. RIDEOUT 2,939,963

PHOTOELECTRIC INSPECTION APPARATUS

Filed May 18, 1956

Inventor
Vincent C. Rideout
By Richard E. Cummins
Attorney

June 7, 1960  V. C. RIDEOUT  2,939,963
PHOTOELECTRIC INSPECTION APPARATUS
Filed May 18, 1956  2 Sheets-Sheet 2

Inventor
Vincent C. Rideout
By Richard E. Cummins
Attorney

United States Patent Office 2,939,963
Patented June 7, 1960

2,939,963
PHOTOELECTRIC INSPECTION APPARATUS

Vincent C. Rideout, Madison, Wis., assignor to Ralph R. Wegner, Wauwatosa, Wis., by decree of distribution to Leona E. Wegner Filed May 18, 1956, Ser. No. 585,887

12 Claims. (Cl. 250—219)

This invention relates in general to photoelectric inspecting apparatus and in particular to photoelectric inspecting apparatus for automatically detecting defects in continuously moving sheet material.

The prior art has suggested various apparatus for inspecting continuously moving sheet material by means of photoelectric sensing devices. The principle on which these apparatus operate is based on the fact that a defect in the material reflects or transmits a different amount of light than material which contains no defect. Hence, the electrical output of the sensing device varies in response to the presence or absence of defects in the material. By connecting the output circuit of the sensing device to an electro responsive reject mechanism through a suitable signal detector, signals above a predetermined threshold level are detected and cause actuation of the reject mechanism. The reject mechanism may be a simple solenoid operated marking device or a complex device for cutting and sorting the inspected material.

These apparatus are quite satisfactory for inspecting materials of relatively narrow widths and for materials in which the defects to be detected cause a relatively large signal output in the sensing device. However, various problems arise with prior art apparatus when it is desired to inspect material such as paper in relatively wide widths.

One difficulty in inspecting material in relatively wide widths is that it becomes necessary to employ a sensing device having a number of phototubes since the scanning ability of a single phototube is limited to a relatively small incremental width.

In suggested prior art apparatus which employ a number of phototubes, the output circuits of the phototubes are usually connected to the reject mechanism through a single signal detector so that a flaw signal from any one of the phototubes operates the reject mechanism. When such apparatus is used to inspect material having minor irregularities not sufficiently large to be classified as defects, the sensitivity of the apparatus is very poor. The reason for the poor sensitivity in prior art apparatus is that the various output signals from the phototubes resulting from minor irregularities in the material add up to a signal sufficient to pass through the signal detector, and thus actuate the reject mechanism, causing unnecessary rejections of material. To overcome this the threshold level of the detector must be increased, resulting in only relatively large flaws being detected. This is a serious disadvantage in that in inspecting certain types of paper where the distinction between a permissible irregularity and a true defect is usually quite fine, the inspecting apparatus does not have sufficient sensitivity to make such a fine distinction.

In addition, since the signals caused by minor irregularities and signals caused by conditions in the phototubes themselves are not constant, allowance must be made in prior art apparatus in setting the threshold level of the detector to insure that under conditions of maximum intensity of these random signals, material is not unnecessarily rejected. This also adversely affects the sensitivity of the apparatus.

According to the present invention, there is provided a photoelectric inspecting apparatus which has improved sensitivity and in which the adverse affect of random signals on the sensitivity of the apparatus is greatly reduced. The improved apparatus includes a multi-channel inspecting arrangement in which each channel includes a pair of phototubes disposed to receive luminous energy reflected respectively from two incremental strips of the material. The output circuits of the phototubes are connected to a control unit which includes an amplifying section for amplifying only the difference in the respective outputs of the two phototubes. The output signals from the amplifying section are fed simultaneously to a main detector and an auxiliary detector. The main detector has an output circuit with a relatively short time constant so that signals from the amplifier section above a predetermined threshold level are detected and these signals cause a reject mechanism to operate. The auxiliary detector has an output circuit with a relatively long time constant and is connected to the main detector to vary the threshold level of that detector in accordance with the random noise signals of the inspecting channel.

If desired, the output circuits of the main detectors of all the inspecting channels may be connected to the electroresponsive reject mechanism through a signal "adder" section so that the mechanism is responsive to the main signal detector of any inspecting channel. The number of inspecting channels employed depends on the width of material being inspected. The improved arrangement results in an apparatus which is readily adaptable to inspecting various widths of material with the sensitivity required to distinguish accurately between small irregularities and true defects.

It is therefore an object of the present invention to provide an apparatus which is readily adapted to inspecting continuously moving sheet material having a relatively large width.

A further object of the present invention is to provide a photoelectric inspecting apparatus having the ability to distinguish accurately between irregularities in the material being inspected and true defects.

A still further object of the present invention is to provide a multi-channel photoelectric inspection apparatus in which the threshold level of the signal detector in each channel varies automatically in accordance with the random signals resulting from irregularities in the material being inspected by the channel.

Objects and advantages other than those mentioned above will be apparent from the following description when read in connection with the drawing in which.

Figure 1:
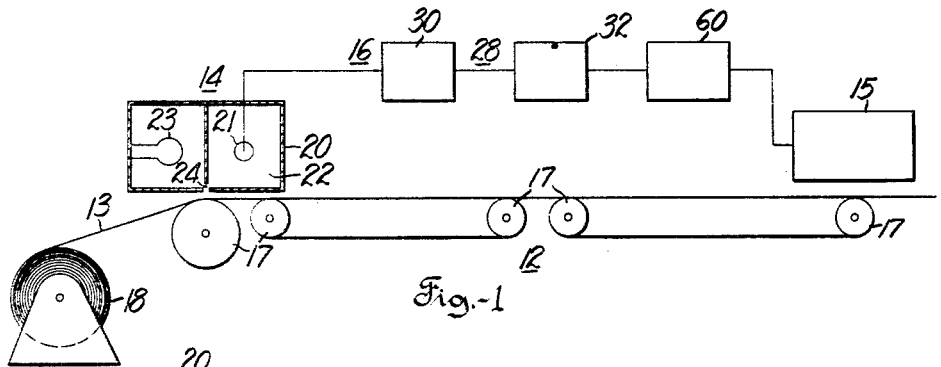
Fig. 1 is a schematic view in elevation of a photoelectric inspecting apparatus embodying the present invention.
Figure 2:
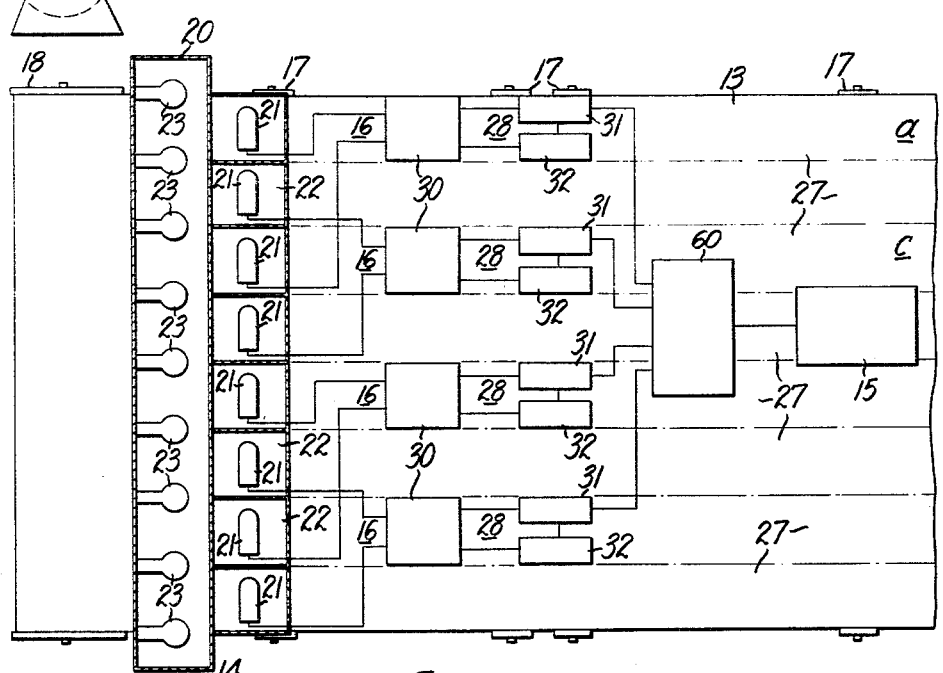
Fig. 2 is a schematic plan view of the apparatus shown in Fig. 1.

Referring to the drawings and particularly to Figs. 1 and 2, the photoelectric inspecting apparatus illustrated therein comprises generally means 12 for feeding material 13 of a relatively wide width continuously past a sensing station 14 to an electroresponsive reject mechanism 15 where the material 13 is classified in accordance with the presence or absence of defects as determined by a plurality of inspecting channels 16.

Since the details of the material feeding system form no part of the present invention and since various material feeding systems known in the art may be employed, the system has been illustrated only schematically in Figs. 1 and 2, and as shown, comprises generally a series of rollers 17 for moving the sheet material 13 from the payoff reel 18 through the sensing station 14 to the reject mechanism 15.

A photoelectric sensing device 20 is positioned at the sensing station 14 and because material 13 has a relatively large width, sensing device 20 includes a plurality of light sensitive devices such as phototubes 21 disposed in individual lightproof compartments 22. Sensing device 20 is disposed transverse to the direction of movement of the material 13 and located slightly above the plane thereof.

In the illustrated embodiment, sensing device 20 also includes a light source such as incandescent bulbs 23 disposed above the material 13 so that luminous energy from bulbs 23 is reflected from the material 13 to the phototubes 21 through the slot 24 in each compartment 22. Phototubes 21 are spaced apart equally and arranged in compartments 22 so that the output of each phototube 21 is responsive to the light energy reflected from an incremental strip portion 27 of material 13 which passes under the phototube.

It should of course be understood that the light source may be disposed below the material so that the outputs of the phototubes are responsive to the light transmitted through the material, rather than reflected from it. A combination of reflected light and transmitted light is of course possible.

Since an irregularity in a strip portion 27 of material 13 being inspected by a phototube 21 causes a different amount of light to be reflected than when no irregularities are present, the output of phototube 21 varies in accordance with the presence or absence of irregularities in the strip portion 27.

In order to actuate the reject mechanism 15 when an irregularity sufficient to be classified as a defect appears and causes a change in the signal output of a phototube 21, a number of inspecting channels 16 are employed.

Each inspecting channel as shown schematically in Figs. 1 and 2 inspects two non-adjacent strip portions 27, and comprises generally a pair of phototubes 21 and a control unit 28. Each control unit 28 comprises an amplifying section 30 for amplifying only the difference in outputs between the pair of phototubes 21, a main signal detector 31, and an auxiliary detector 32.

Figure 4:
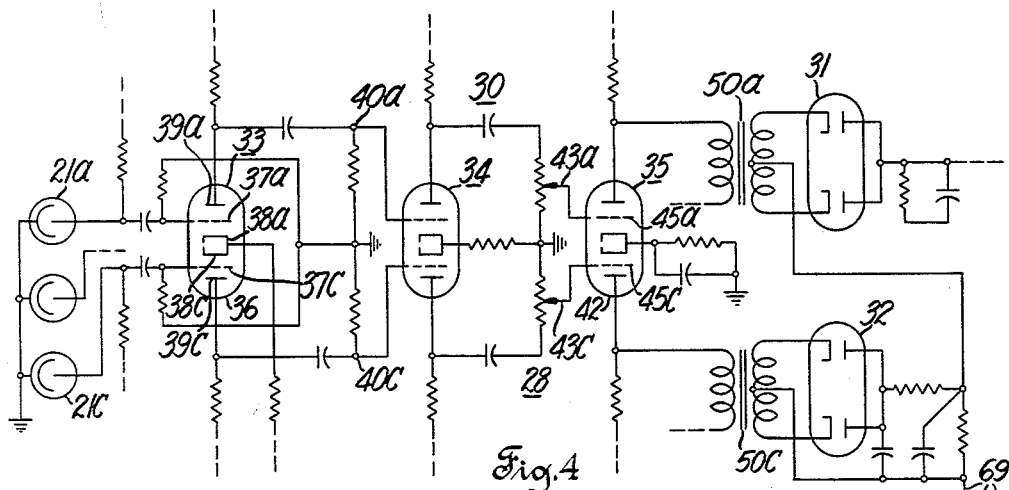
Fig. 4 is a diagrammatic view of one of the inspecting channels shown in Figs. 1 and 2.

Since the inspecting channels 16 are similar, only one is described in detail. Referring now to Fig. 4, the inspecting channel illustrated therein includes the pair of phototubes 21a and 21c whose outputs are responsive to light reflected from non-adjacent incremental strip portions 27a and 27c of material 13. The output circuits of phototubes 21a and 21c are connected to the amplifying section 30 of control unit 28. The amplifying section 30 as shown comprises a differential amplifying stage 33, an intermediate amplifying stage 34, and a final amplifying stage 35.

The differential amplifying stage comprises a twin triode tube 36 including grids 37a and 37c, cathodes 38a and 38c and anodes 39a and 39c. In a differential amplifier the output voltages from both halves of the amplifier are equal and proportional to only the difference in input signals to their respective grids. Phototubes 21a and 21c are connected respectively to grids 37a and 37c so that an output voltage $E_{L1}$ appears at terminal 40a of amplifier 33 and an output voltage $E_{L2}$ appears at terminal 40c. These voltages are equal and proportional to the difference in signals impressed on grids 37a and 37c from phototubes 21a and 21c. For a more detailed description of the operation of a differential amplifier, reference may be had to chapter 8, section 8–1 of the text, entitled, "Electron Tube Circuits," by Seely, published in 1950, by the McGraw-Hill Book Company.

In the preferred embodiment illustrated in Fig. 4 an intermediate amplifier stage 34 is provided for amplifying both signals $E_{L1}$ and $E_{L2}$. This amplifier may be an ordinary R-C coupled amplifier, but if the gain of the differential amplifier 33 is sufficient, stage 34 may be omitted.

Control unit 28 further includes a final amplifying stage 35 comprising twin triode tube 42. Each half of tube 42 is R-C coupled to the preceding stage through variable resistors or potentiometers 43a and 43c. Potentiometer 43a varies the input voltage to grid 45a of the upper half of tube 42 while potentiometer 43c varies the input voltage to grid 45c of the other half of tube 42.

The output circuits of the final amplifying stage 35 are connected respectively to main signal detector 31 and auxiliary signal detector 32 through transformers 50a and 50c. As shown both signal detectors 31 and 32 are full wave diode detectors. Auxiliary detector 32 is unbiased so that its output voltage is directly proportional to the difference in signal outputs of phototubes 21a and 21c. The output circuit of auxiliary detector 32 has a relatively long time constant.

The main signal detector 31 has a relatively short time constant and is biased so that only signals from the upper half of tube 42 above a predetermined threshold level cause a signal in its output circuit. The threshold level of detector 31 is determined initially by the bias voltage obtained through a bias circuit including potentiometer 53. The bias voltage on the main signal detector 31 is thereafter varied automatically in accordance with the output voltage of the auxiliary detector 32 so that the threshold level of the main signal detector 31 varies in accordance with the average level of the random noise of the inspecting channel.

Figure 5:
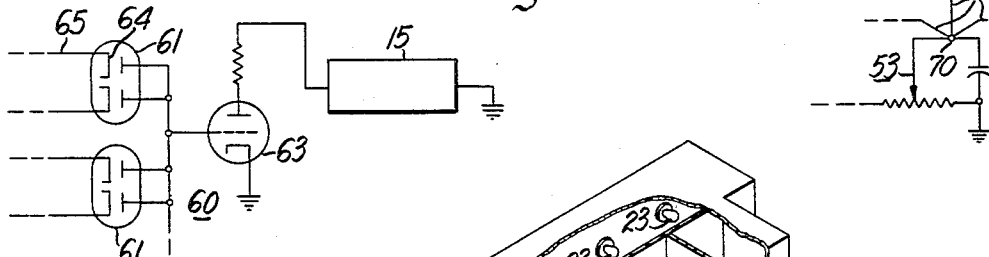
Fig. 5 is a diagrammatic view of the signal adder section shown in Figs. 1 and 2.
Figure 3:
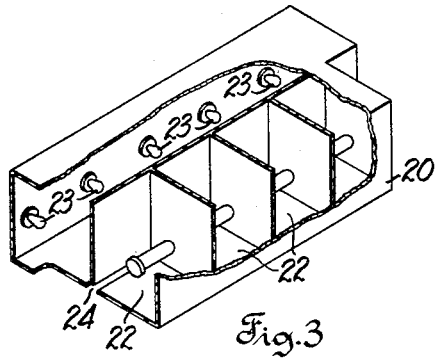
Fig. 3 is an isometric view of the sensing device shown in Figs. 1 and 2.

In order to operate the reject mechanism 15 in response to signals from each inspecting channel 16, a signal adder section 60 is employed as shown in Fig. 5. Adder section 60 comprises a diode decoupler tube 61 for each pair of inspecting channels 16 and an adder tube 63, which has its plate circuit connected to reject mechanism 15.

The output circuit of the main signal detector 50a is connected to a cathode 64 of one of the diode decouplers 61 through connector 65. A signal from any main detector 31 varies the grid bias of tube 63 causing that tube to conduct current momentarily and operate reject mechanism 15.

Reject mechanism 15 is illustrated only schematically since any suitable device known in the art may be employed. Reject mechanism 15 may for example be a simple device for marking an edge of the material 13 to indicate a flaw in that transverse portion of the material and may include suitable time delay circuits to coordinate its response with the time required for the material 13 to move from the sensing station 14 to the reject mechanism 15.

Assuming that the various inspecting channels 16 are suitably energized and that the material 13 is being fed past the sensing station 14 to the reject mechanism 15, the operation of the apparatus is substantially as follows.

Considering the operation of a single inspecting channel, for example the inspecting channel which examines incremental strips 27a and 27c, if a transverse portion of these strips contains only small irregularities not sufficient to be classified as defects the output voltage of each phototube 21a and 21c will vary only slightly, and comprise what is called random noise or paper noise. Specifically, the output voltage of phototube 21a will consist of a voltage due to the slight irregularities in strip portion 27a plus a voltage due to conditions in the phototube 21a and its associated circuits. Similarly, the output voltage of phototube 21c will contain a voltage due to the slight irregularities in strip portion 27c plus a voltage due to conditions in phototube 21c and its associated circuits.

Since there is only a slight difference in the signals applied to grids 37a and 37c, the signals from the amplifying section 30 which are fed to the main detector 31 and the auxiliary detector 32 are comparatively small and are below the threshold level of main detector 31 as previously set by potentiometer 53. As a result no signal is transmitted through the main detector 31 to the reject mechanism 15.

However, if a flaw should be present in the material 13, and assuming it is in either strip portion 27a or 27c, the difference in output voltages between phototubes 21a and 21c will be relatively large. Because of the action of the differential amplifier 33 a relatively large signal is applied to the main detector 31 and the auxiliary detector 32 from amplifying section 30. The signal applied to the main detector 31 momentarily exceeds the threshold level of the detector and causes a signal to be applied to the reject mechanism 15 through the adder section 60.

Since the output circuit of the auxiliary detector 32 has a relatively long time constant, the relatively large pulse signal which is caused by the flaw being detected and which is momentarily applied to the auxiliary detector, has little or no effect on the biasing or threshold level of the main detector 31. The main detector 31 on the other hand has a relatively short time constant and hence responds immediately to such short transients as may be caused by the passing of a flaw under one of the phototubes.

The function of the auxiliary detector 32 is to provide automatic biasing of the main detector 31 in accordance with the random noise of the channel. The advantage of the automatic biasing is that if the random noise level or amplifier gain of the channel increases, the bias or threshold level of the main detector 31 is correspondingly increased. The sensitivity of the inspecting channel 16 therefore remains substantially constant as set by potentiometer 53.

Without such an arrangement an increase in random noise or amplifier gain would result in continuous rejection, and a decrease in random noise or amplifier gain would result in passing of material containing flaws.

As mentioned previously, the sensitivity of the apparatus to detect a particular size flaw is predetermined by the fixed bias on the main detector and is controlled by the setting of potentiometer 53. The main detector 31 of each inspecting channel 16 preferably is initially biased from a common source such as potentiometer 53, suitable connections 69 being made to terminal 70 as illustrated in Fig. 4.

It will be readily seen from the foregoing description that the present invention has many advantages. It is readily adaptable to inspecting various widths of material with any desired degree of sensitivity. It is most advantageous in inspecting relatively wide sheets of material, such as paper, since any number of channels may be employed depending on the width of the material. It is of course advantageous in examining narrow widths of materials also because of its extreme sensitivity and the fact that the sensitivity of each inspecting channel is not affected by random noise.

While only one embodiment of the invention has been illustrated and described it will be apparent to those skilled in the art that modifications may be made therein without departing from the spirit of the invention or from the scope of appended claims.

It is claimed and desired to secure by Letters Patent:

1. An apparatus for detecting defects in sheet material comprising a sensing device, a reject mechanism, means to move said material past said device to said reject mechanism, and control means for operating said reject mechanism in accordance with the output of said sensing device, said sensing device comprising a light source and a plurality of light sensitive devices spaced transversely to the direction of movement of said material so that the outputs of said light sensitive devices vary in accordance with irregularities present in predetermined incremental strip portions of said material, said control means including means connected to a preselected pair of said light sensitive devices operable in response to joint outputs therefrom to generate control signals proportional to only the difference in output signals from said preselected pair of said light sensitive devices, a main detector responsive to signals from said generating means above a predetermined threshold level to cause actuation of said reject mechanism, means for initially setting said threshold level, and detector means connected to said main detector having a time constant which is long compared to the time constant of said main detector and responsive to signals from said generating means to vary said threshold level of said main detector automatically in accordance with said difference in output signals.

2. An apparatus for detecting defects in continuous sheet material comprising in combination means for moving said material through said apparatus, first and second light sensitive devices, means for developing output signals in said devices in response to surface irregularities in predetermined incremental strip portions of said material, means for classifying a transverse portion of said material containing a particular size irregularity, and control means to actuate said classifying means in response to said output signals, said control means comprising differential amplifying means having a pair of input circuits and a pair of output circuits, means connecting said pair of input circuits respectively to said first and second devices to cause signals in said pair of output circuits proportional to the difference between said output signals of said devices, a first detector having a relatively short time constant, a second detector having a relatively long time constant, means coupling the input circuits of said first and second detectors respectively to said pair of output circuits, means for biasing said first detector to set the sensitivity of said apparaus to detect signals above a predetermined threshold level resulting from irregularities of said particular size, means connecting the output of said second detector to said biasing means to vary said threshold level automatically to maintain said sensitivity substantially constant, and means responsive to signals detected by said first detector to actuate said classifying means.

3. An apparatus for detecting defects in continuous moving sheet material comprising a photoelectric sensing device, a reject mechanism, means to move said material past said sensing device to said reject mechanism, and control means for operating said reject mechanism in accordance with the output of said sensing device, said sensing device comprising a light source and a plurality of phototubes spaced transversely to the direction of movement of said material so that the outputs of said phototubes vary in accordance with irregularities present in predetermined incremental strip portions of said material, said control means including means connected to a preselected pair of said phototubes operable in response to joint outputs therefrom to generate control signals proportional to only the difference in output signals from said preselected pair of phototubes, a main detector connected to said generating means responsive to signals therefrom above a predetermined threshold level to cause actuation of said reject mechanism, means connected to said main detector for initially setting said threshold level to control the sensitivity of said apparatus to detect a particular size irregularity, and detector means connected between said generating means and said main detector responsive to signals from said generating means to vary said threshold level of said main detector automatically to maintain said sensitivity substantially constant.

4. An apparatus for detecting flaws in relatively wide continuous sheet material comprising in combination means for moving said material through said apparatus, a plurality of phototubes for inspecting incremental strip portions of said material, means for causing the outputs of said phototubes to vary in accordance with the surface characteristics of said respective strip portions, an electroresponsive device for classifying a transverse portion of said material containing a flaw, and a plurality of control units to actuate said device, each of said control units comprising a differential amplifier having a pair of input circuits and a pair of output circuits, means connecting said input circuits respectively to a preselected pair of said phototubes to cause identical signals in each of said output circuits proportional to only the difference in signal outputs between said phototubes, a first diode detector having an output circuit with a relatively short time constant, means coupling one of said amplifier output circuits to said first diode detector, means for biasing said first diode detector to cause said signals from said amplifier above a predetermined threshold level to be detected, a second detector having an output circuit with a relatively long time constant, means coupling the other of said amplifier output circuits to said second diode detector, means connecting the output circuit of said second diode detector in circuit with said biasing means to vary said threshold level in accordance with the difference in signal outputs from said pair of phototubes; and means connecting the output circuit of said first diode detector of each said control units to said electroresponsive device.

5. The apparatus called for in claim 4 in which the outputs of said preselected pair of phototubes vary in accordance with the surface characteristics of non-adjacent incremental strip portions of said material.

6. In a photoelectric flaw detecting apparatus for inspecting continuous moving sheet material including a pair of light sensitive devices whose individual outputs are responsive to surface irregularities in preassigned incremental strip portions of said material and a mechanism for designating that a transverse portion of said material contains a flaw, the combination of differential amplifying means having a pair of input circuits and a pair of output circuits, a first detector, a second detector, means connecting said input circuits respectively to said devices and said output circuits respectively to said detectors, said amplifying means being operable to feed only identical signals to said detectors which are proportional to the difference in signals received by said amplifying means from said devices, means for causing operation of said mechanism in response to signals detected by said main detector, means for controlling the sensitivity of said apparatus to detect irregularities of a particular size comprising means for biasing said main detector to cause signals from said amplifying means above a predetermined threshold level to be detected, and means connecting the output of said second detector to said biasing means for varying said threshold level in response to output signals from said second detector to maintain said sensitivity substantially constant.

7. In a photoelectric flaw detecting apparatus for inspecting continuous moving sheet material including a pair of phototubes whose individual outputs are responsive to surface irregularities in preassigned incremental strip portions of said material, and a mechanism for designating that a transverse portion of said material contains a flaw, the combination of differential amplifying means having a pair of input circuits and a pair of output circuits, means connecting said pair of input circuits respectively to said pair of phototubes whereby only the difference in signals from said phototubes is amplified to produce identical signals in said output circuits of said amplifying means, a main biased detector having a relatively short time constant coupled to one of said output circuits, an auxiliary unbiased detector having a relatively long time constant coupled to the other of said output circuits, means for setting the sensitivity of said apparatus to detect irregularities of a particular size comprising a bias circuit for said main detector to cause signals above a predetermined threshold level to be detected, means connecting said main detector to said mechanism to cause operation thereof by said detected signals, and means connecting said auxiliary detector to said bias circuit to vary said threshold level automatically in accordance with the signals from said amplifying means to maintain said sensitivity substantially constant.

8. In a photoelectric flaw detecting apparatus for inspecting continuous moving sheet material including a plurality of phototubes whose individual outputs are responsive to surface irregularities in preassigned incremental strip portions of said material, and a mechanism for designating that a transverse portion of said material contains a flaw, the combination of a plurality of control units to operate said mechanism, each of said control units comprising an amplifying section, a main detector having a relatively short time constant and an auxiliary detector having a relatively long time constant, said amplifying section comprising a differential amplifier, a first triode amplifier and a second triode amplifier, said differential amplifier having a pair of input circuits connected respectively to a preselected pair of said phototubes and a pair of output circuits R–C coupled respectively to said first and second triode amplifiers, means for coupling the output of said first triode amplifier to said main detector, and means for coupling the output of said second triode amplifier to said auxiliary detector, means for setting the sensitivity of said apparatus to detect irregularities of a particular size comprising means for biasing said main detector to cause only signals from said amplifier section above a predetermined threshold level to be detected, and means for connecting the output of said auxiliary detector to said biasing means to vary said threshold level automatically in accordance with signals from said amplifier section to maintain said sensitivity substantially constant.

9. In a photoelectric flaw detecting apparatus for inspecting continuous moving sheet material including a plurality of phototubes whose individual outputs are responsive to surface irregularities in preassigned incremental strip portions of said material, and a mechanism for designating that a transverse portion of said material contains a flaw, the combination of a plurality of control units to operate said mechanism, each of said control units comprising an amplifying section, a first full wave diode detector having a relatively short time constant, a second full wave diode detector having a relatively long time constant, said amplifying section comprising a differential amplifier and first and second triode amplifiers, said differential amplifier having a pair of input circuits connected respectively to a preselected pair of said phototubes and a pair of output circuits R–C coupled respectively to said first and second triode amplifiers, means connecting the output of said first triode amplifier to said main detector, means connecting the output of said second triode amplifier to said auxiliary detector, means connecting the output of said first detector to said mechanism, means for setting the sensitivity of said apparatus to detect irregularities of a particular size comprising means for biasing said first detector to cause only signals above a predetermined threshold to actuate said mechanism, and means connecting the output of said second detector to said biasing means to vary said threshold level in proportion to the difference in signals developed by said pair of phototubes to maintain said sensitivity substantially constant.

10. The combination recited in claim 9 in which said R–C couplings between said output circuits of said differential amplifier and said first and second triode amplifier includes a potentiometer.

11. In a photoelectric flaw detecting apparatus for inspecting moving sheet material the combination comprising a pair of light sensitive devices whose individual outputs vary respectively in response to surface irregularities of the same nature in different incremental strip portions of said material, means for generating a first signal corresponding to the difference in outputs of said pair of light sensitive devices, main detector means connected to said generating means responsive to said first signals above a predetermined threshold level of said detector for generating a control signal to control said apparatus, and auxiliary detector means having a time constant which is long compared to the time constant of said main detector means connected between said generating means and said main detector and operable to vary said threshold level in response to said first signals.

12. An apparatus for detecting flaws in material comprising means for obtaining first and second signals corresponding respectively to surface irregularities of the same nature occuring in first and second areas of said material, means connected to said obtaining means responsive to said first and second signals for generating a third signal corresponding to the difference in said first and second signals, detecting means connected to said generating means for providing a control signal for said apparatus in response to said third signals above a predetermined threshold level, and auxiliary means connected between said generating means and said detecting means having a time constant which is long compared to the time constant of said detecting means for providing a bias signal to said detecting means to vary said threshold level in response to said third signal.

References Cited in the file of this patent

UNITED STATES PATENTS

| | | |
|---|---|---|
| 2,183,606 | Day | Dec. 19, 1939 |
| 2,427,319 | Weathers | Sept. 9, 1947 |
| 2,432,151 | Hammond | Dec. 9, 1947 |
| 2,570,288 | Todd | Oct. 9, 1951 |
| 2,641,960 | Strother | June 16, 1953 |
| 2,696,297 | Matthews | Dec. 7, 1954 |
| 2,701,356 | Coleman | Feb. 1, 1955 |
| 2,742,151 | Milford | Apr. 17, 1956 |
| 2,753,464 | Stone | July 3, 1956 |
| 2,790,896 | Clark | Apr. 30, 1957 |